Patented July 26, 1938

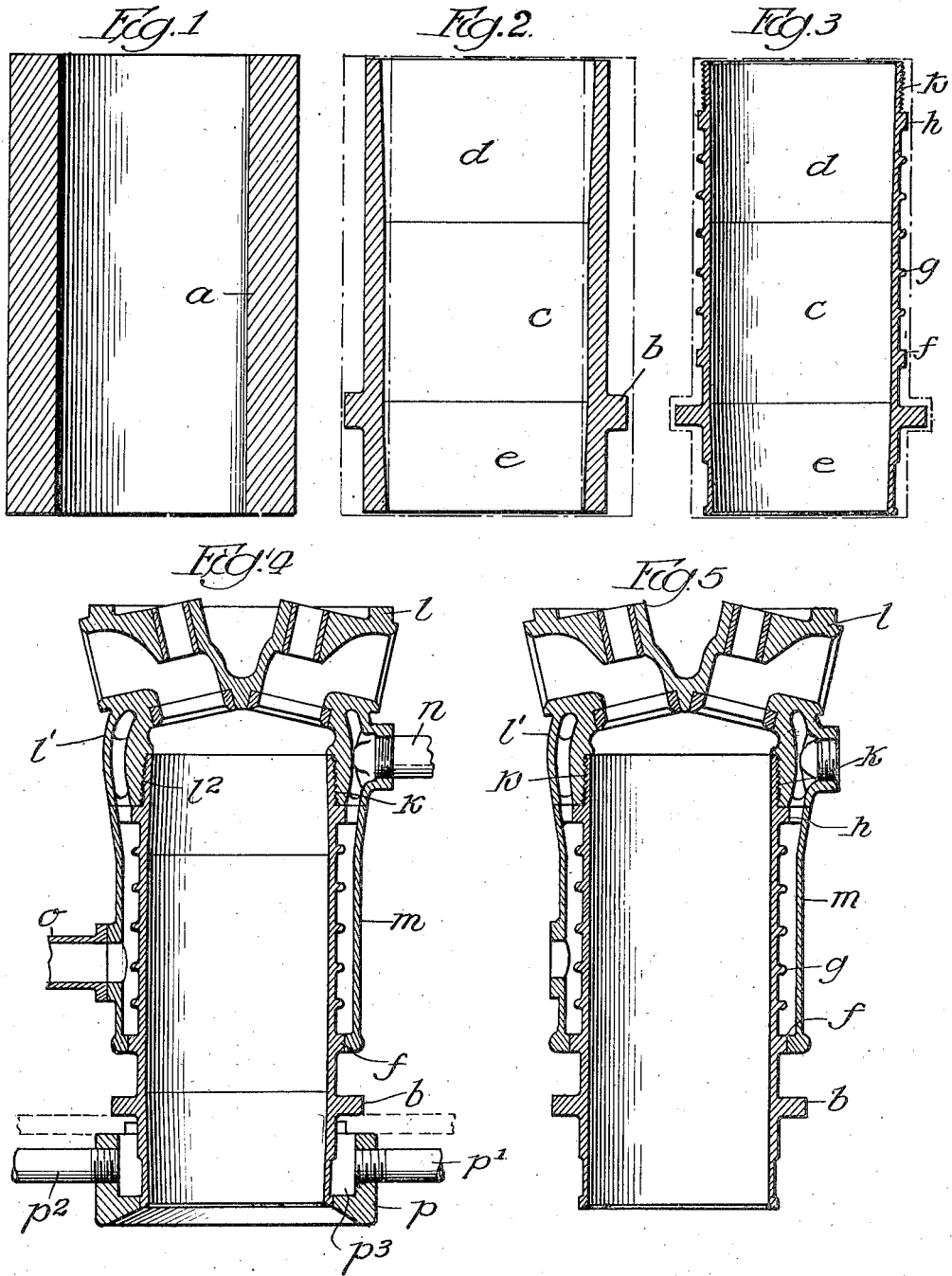

2,125,106

UNITED STATES PATENT OFFICE 2,125,106

METHOD OF PRODUCING CYLINDERS FOR INTERNAL COMBUSTION ENGINES

Edward Fayette Gehret, Jersey Shore, Pa., assignor, by mesne assignments, to Aviation Manufacturing Corporation, Chicago, Ill., a corporation of Delaware Application September 30, 1935, Serial No. 42,744

12 Claims. (Cl. 29—156.4)

The invention relates to production of cylinders and cylinder blocks for internal combustion engines.

In the production of cylinder blocks composed of forged barrels and heads or jackets shrunk thereon, distortions result from stresses due to machining stock, from the barrel-forging, heat and chemical treatment and shrinking of the heads or jackets on the barrel and operating temperatures.

One object of the invention is to provide a method of producing cylinders or cylinder blocks for internal combustion engines, which provides compensation for the aforesaid distortions.

Another object of the invention is to provide a method of producing cylinder blocks comprising heads shrunk on barrels in which the aforesaid distortions are compensated for by varying the bore diameter of the cylinder along its length.

Another object of the invention is to provide an improved method of producing cylinder blocks composed of forged barrels and heads shrunk thereon in which the finishing operation on the bore of the cylinder is effected while the assembly is maintained at operating temperatures with temporary heating means.

Another object of the invention is to provide a method of producing cylinders for internal combustion engines which will result in truly cylindrical bores under operating temperatures.

Other objects of the invention will appear from the description of the method.

In attaining these objects, the invention contemplates the machining of a cylindrical forging to vary its bore diameter along the length of the cylinder, heat and chemically treating the forging, machining the outside of the machine forging to the desired shape for the application of the cylinder head and water jacket and connection to the crank-case, leaving the internal periphery unmachined after the foregoing treatment, shrinking the head and water jacket on the cylinder, applying heat to the cylinder assembly substantially according to operating temperature gradient, to compensate for the shrinkage caused by shrinking of the head and jacket thereon and finishing the bore while the cylinder is thus heated, so that it will be truly cylindrical substantially at the operating temperatures.

The invention consists in the several novel features hereinafter set forth and more particularly defined by claims at the conclusion hereof.

In the drawing, Fig. 1 is a longitudinal section of the forged cylindrical blank for the barrel or cylinder. Fig. 2 is a similar view showing the barrel with its bore diameter machined and varied along its lengths to compensate for the distortions resulting from subsequent steps in the method of manufacture, and its outside machined for the flange used in securing the cylinder to the crankcase. Fig. 3 is a similar view showing the barrel after it has been heat and chemically treated and the outside thereof machined, after such treatment, for assembly with the cylinder head and water jacket. Fig. 4 is a section of the cylinder block or assembly after the head and water jacket have been shrunk thereon, with the temporary connections for circulating a heating medium, such as oil, through the coolant chamber in the head and around the jacketed portion of the cylinder, and around the inner end of the cylinder. Fig. 5 is a section through the finished cylinder-block.

In the production of cylinder blocks, according to the invention, a cylindrical forged blank $a$ of suitable metal, such as steel, and substantially the length of the cylinder, is provided with a metal wall of sufficient thickness to form the desired integral flange thereon, as shown in Fig. 1.

Next, the outside of the blank $a$ is machined to leave an annular rib for a flange $b$ used in securing the cylinder block to the crank-case and to leave the wall of sufficient thickness for subsequent machining of the barrel to leave integral annular ribs, a shoulder for the cylinder head, and a seat for the water jacket, as shown in Fig. 2. The barrel-forging is also internally machined to form a central cylindrical portion $c$, a flared outer portion $d$ extending from the upper end of a cylinder portion $c$ to the upper end to which the cylinder head is to be attached, and a tapered portion $e$ extending from the lower end of the cylinder portion $c$ to the lower end of the cylinder which is to be attached to the crank-case of the engine, as shown in Fig. 2. This contour leaves sufficient stock on the outer diameter of the barrel to prevent distortion and to allow removal of the nitrided case on all surfaces except the internal diameter. This contour of the bore diameter is required so that when the head and jacket are shrunk on the barrel and the assembly heated to approximately operating temperatures the bore or internal diameter will become a true cylindrical surface.

Next, the barrel, after being machined as shown in Fig. 2, is heat and chemically treated. For example, by nitriding to produce the desired density or property, more particularly in the metal of the internal periphery or bore of the cylinder for purposes well understood in the art. During the nitriding treatment, the forged steel grows as the result of the nitriding treatment.

Next, the outside of the nitrided barrel is machined to finish the flange $b$ and the inner end of the barrel for connection to the crank-case of the engine and to form an annular seat $f$ for the inner end of the water jacket $m$, annular reinforcing ribs $g$, a shoulder $h$ for the cylinder head $l$, and a screw-thread $k$ for connection with the cylinder head, as shown in Fig. 3. The removal of the stock from the outside of the inner end portion of the barrel will cause the tapered portion $e$ to be enlarged to expand somewhat approximately to the diameter of the central portion $c$. No machining is done on the internal diameter or bore of the barrel after it has been nitrided so that the structure of the metal of the bore will not be altered.

Next, the water jacket $m$ and the cylinder head $l$ are shrunk onto the barrel after it has been nitrided and machined to the contour shown in Fig. 3. The head is secured on the upper end of the barrel by screw-threads $l^2$. The water jacket $m$, at its upper end, is shaped to be shrunk around the flange $h$ of the barrel and its lower end is shaped to be shrunk on the flange $f$ of the barrel. The cylinder head $l$ and water jacket may be formed of such metal as aluminum or a suitable alloy. The shrinking of the head and the jacket on the barrel distorts or deforms the bore of the cylinder and results in contracting the upper end of the cylinder so that the portion $d$ of the bore therein will become slightly tapered, as shown in Fig. 4. The shrinking of the jacket around the flange $f$ also causes a slight contraction of the bore of the barrel. The head $l$ is provided with a coolant chamber $l'$ in communication with the inside of the water jacket $m$. The head $l$ is provided with an inlet for the coolant and the water jacket is provided with an outlet therefor.

Next, a pipe $n$ is temporarily connected to the coolant inlet in the cylinder head $l$ and an outlet pipe $o$ is temporarily connected to the coolant outlet in the jacket $m$. A heating medium, such as hot oil, is then circulated from pipe $n$ around the chamber $l'$ in head $l$ and around the barrel. The circulating medium, after heating the head and barrel, flows out through pipe $o$. The temperature of the heating medium is substantially in accordance with the operating temperature gradient in the cylinder block at operating temperature, the highest temperature being in the head and upper end of the cylinder and the lowest adjacent the inner end of the cylinder and, in practice, usually ranging from 500° to 150° F. A suitable fixture $p$, which is adapted to fit around the inner end of the barrel, is equipped with inlet and outlet pipes $p'$, $p^2$, and a chamber $p^3$ for circulation of a heating medium around the inner end of the barrel. This fixture is temporarily applied to the barrel for this purpose. Simultaneously with the circulation of the heating medium through the head and around the cylinder, a heating medium, such as oil, is circulated through the fixture $p$ to heat the inner end of the barrel to a temperature corresponding substantially to its operating temperature, usually approximately 150° F. This heating of the barrel causes the head and the several portions of the barrel which have been distorted by the previous steps of the method, to be compensated for so that the portions $d$, $c$ and $e$ of the cylinders will be expanded to substantially truly cylindrical form.

While the operating temperature gradient in the cylinder-block is maintained by the circulation of the heating medium, as aforesaid, the entire internal periphery or bore of the barrel is finished by lapping, honing, or grinding, so that all portions of the nitrided internal periphery of the bore of the cylinder will be truly cylindrical at substantially working temperatures for the operation of the piston therein.

The contour of the bore portions $c$, $d$ and $e$ of the barrels will vary with different types and sizes of assemblies. For example, it has been found in producing a cylinder for a piston 5¼" in diameter, that when the outer end of bore portion $d$ is .006 of an inch less in diameter than the central cylindrical portion $c$ and the smallest diameter of the tapered bore portion $d$ is about .006 of an inch less in diameter than the central cylindrical portion $c$, the bore contour will substantially compensate for distortions resulting from the removal of stock from the outside of the cylinder after nitriding and the shrinking of the head and jacket on the barrel and the finishing of the bore, while heated as set forth, will result in a truly cylindrical bore under operating conditions. The temperature of the assembly during the finishing operation may also be varied to correspond to the different operating temperatures of the engine.

The invention exemplifies a method of producing cylinders and cylinder-blocks for internal combustion engines whereby the finished cylinders will be truly cylindrical under operating temperatures, and in which the bore diameter of the blank is initially varied along the length of the cylinder to substantially compensate for distortions due to the relief of stresses in removing stock from around the barrel, heat and chemical treatment, and shrinking the heat and water jacket on the barrel.

The invention is not to be understood as restricted to the details set forth, since these may be modified within the scope of the appended claims, without departing from the spirit and scope of the invention.

Having thus described the invention, what I claim as new and desire to secure by Letters Patent is:

1. That improvement in producing cylinders for internal combustion engines, which consists in heat and chemically treating a forged barrel, having a bore diameter of varying diameter along its length, machining the outside of the barrel, shrinking a head on the barrel, and heating the assembly, the variation in the bore diameter being such as to substantially compensate for the operations after the heat and chemical treatment.

2. That improvement in producing a cylinder for an internal combustion engine, which consists in shrinking a head on a forged barrel, the bore diameter of the barrel being varied to substantially compensate for the distortion resulting from shrinking the head thereon, heating the assembly to substantially operating temperature, and finishing the inner periphery of the barrel while the assembly is so heated.

3. That improvement in the manufacture of an internal combustion engine-cylinder, which consists in forming a cylinder-barrel with a varying bore diameter along its length, and removing stock from the outside of the barrel to shape it for connection to a cylinder-head and crankcase, the variation in the bore diameter being such as to compensate for distortion which results from the relief of stresses caused by such removal of the stock.

4. That improvement in the manufacture of an internal combustion engine-cylinder, which consists in forming a cylinder-barrel with its bore diameter varied along its length, and heat treating the barrel so formed, the variation in bore diameter being such as to compensate for distortion resulting from said treatment.

5. That improvement in the manufacture of an internal combustion engine-cylinder, which consists in forming a cylinder-barrel with its bore diameter varied along its length, and chemically treating the barrel so formed, the variation in bore diameter being such as to compensate for distortion resulting from said treatment.

6. That improvement in the manufacture of an internal combustion engine-cylinder, which consists in forming a cylindrical forging with a bore diameter varying along its length, heat and chemically treating the forging and removing stock from the outside of the forging to shape the barrel for connection to a cylinder-head, the variation in bore diameter being such as to compensate for the removal of the stock.

7. That improvement in the manufacture of an internal combustion engine-cylinder, which consists in forming a cylindrical forging with a bore diameter varying along its length, chemically treating the forging, and removing stock from the outside of the forging to shape the barrel for connection to a cylinder-head and a crank-case, the variation in bore diameter being such as to compensate for such removal of the stock.

8. That improvement in the manufacture of an internal combustion engine-cylinder, which consists in forming a barrel with a flaring bore-diameter adjacent one of its ends and a tapering bore-diameter adjacent its other end, and removing stock from the outside of the treated forging, to shape it for connection to a cylinder-head and a crank-case, the flaring and tapering of the bore-diameter being such as to compensate for the distortion which results from the relief of stresses caused by such removal of the stock.

9. That improvement in the manufacture of an internal combustion engine-cylinder, which consists in forming a barrel with a flaring bore-diameter adjacent one of its ends and a tapering bore-diameter adjacent its other end, heat and chemically treating the barrel, and removing stock from the outside of the treated forging, to shape it for connection to a cylinder-head and a crank-case, the flaring and tapering of the bore-diameter being such as to compensate for the distortion which results from the relief of stresses caused by such removal of the stock and heat and chemical treatment.

10. That improvement in the manufacture of a cylinder for an internal combustion engine, which consists in forging a barrel-blank, varying the bore-diameter of the barrel along its length, heat and chemically treating the barrel, and shrinking a cylinder-head on the barrel, the variation in the bore-diameter being such as to compensate for distortion resulting from the heat and chemical treatment and shrinking of the head on the barrel.

11. That improvement in the manufacture of a cylinder for an internal combustion engine, which consists in shrinking a head on a barrel having its internal diameter shaped to compensate for distortion by the shrinking of the head on the barrel, heating the assembled barrel and head to substantially operating temperature, and finishing the inner periphery of the barrel while the assembly is so heated.

12. That improvement in the manufacture of a cylinder for an internal combustion engine, which consists in forging a cylinder-barrel, nitriding the barrel, shaping the outside of the barrel to receive a head, shrinking a head on the barrel, the forging having its bore varied along its length to compensate for distortion due to nitriding, shaping and shrinking the head thereon, heating the assembled head and barrel to substantially operating temperature, and finishing the bore while the assembly is thus heated.

EDWARD F. GEHRET.